US008981606B2

(12) United States Patent
Vitello et al.

(10) Patent No.: US 8,981,606 B2
(45) Date of Patent: Mar. 17, 2015

(54) BOLTED CONNECTOR FOR STATOR COILS OF AN ELECTRICAL GENERATOR

(75) Inventors: Travis J. Vitello, DeBary, FL (US); Mukesh Kumar Jaluthariya, Rajasthan (IN)

(73) Assignee: Siemens Energy, Inc., Orlando, FL (US)

( * ) Notice: Subject to any disclaimer, the term of this patent is extended or adjusted under 35 U.S.C. 154(b) by 423 days.

(21) Appl. No.: 13/474,888

(22) Filed: May 18, 2012

(65) Prior Publication Data

US 2013/0307359 A1 Nov. 21, 2013

(51) Int. Cl.
*H02K 3/50* (2006.01)

(52) U.S. Cl.
CPC ...................................... *H02K 3/505* (2013.01)
USPC ............................................ 310/71; 310/260

(58) Field of Classification Search
CPC ................................. H02K 3/50; H02K 3/505
USPC ............................ 310/71, 197, 201, 204, 260
See application file for complete search history.

(56) References Cited

U.S. PATENT DOCUMENTS

| 4,072,873 | A | 2/1978 | Nottingham |
| 4,415,825 | A | 11/1983 | Dailey et al. |
| 4,806,807 | A | 2/1989 | Levino |
| 4,894,575 | A | 1/1990 | Nilsson et al. |
| 4,912,831 | A * | 4/1990 | Levino ............................ 29/596 |
| 6,373,165 | B1 | 4/2002 | Rowe |
| 6,784,573 | B1 | 8/2004 | Iversen et al. |
| 7,088,020 | B2 | 8/2006 | Holly, III et al. |
| 7,321,179 | B2 | 1/2008 | Ward et al. |
| 7,400,072 | B2 | 7/2008 | Ward |
| 2004/0189109 | A1 | 9/2004 | Holly, III et al. |
| 2005/0275306 | A1* | 12/2005 | Ward et al. ....................... 310/71 |
| 2006/0125343 | A1* | 6/2006 | Ward ............................... 310/71 |
| 2009/0261670 | A1* | 10/2009 | Tekawade ....................... 310/71 |

* cited by examiner

*Primary Examiner* — Michael Andrews

(57) ABSTRACT

A connector assembly that mechanically and electrically connects respective ends of first and second stator coil sections includes first and second clip assemblies, first and second connector bar assemblies, and first and second coupling structures. The first clip assembly includes first and second clip members and the second clip includes third and fourth clip members. The first and second connector bar assemblies are coupled to the first and third clip members and to the second and fourth clip members, respectively, to structurally couple the first stator coil section to the second stator coil section. The first clip member, the first connector bar assembly, and the third clip member create a first path for electric current between the stator coil sections, and the second clip member, the second connector bar assembly, and the fourth clip member create a second path for electric current between the stator coil sections.

18 Claims, 3 Drawing Sheets

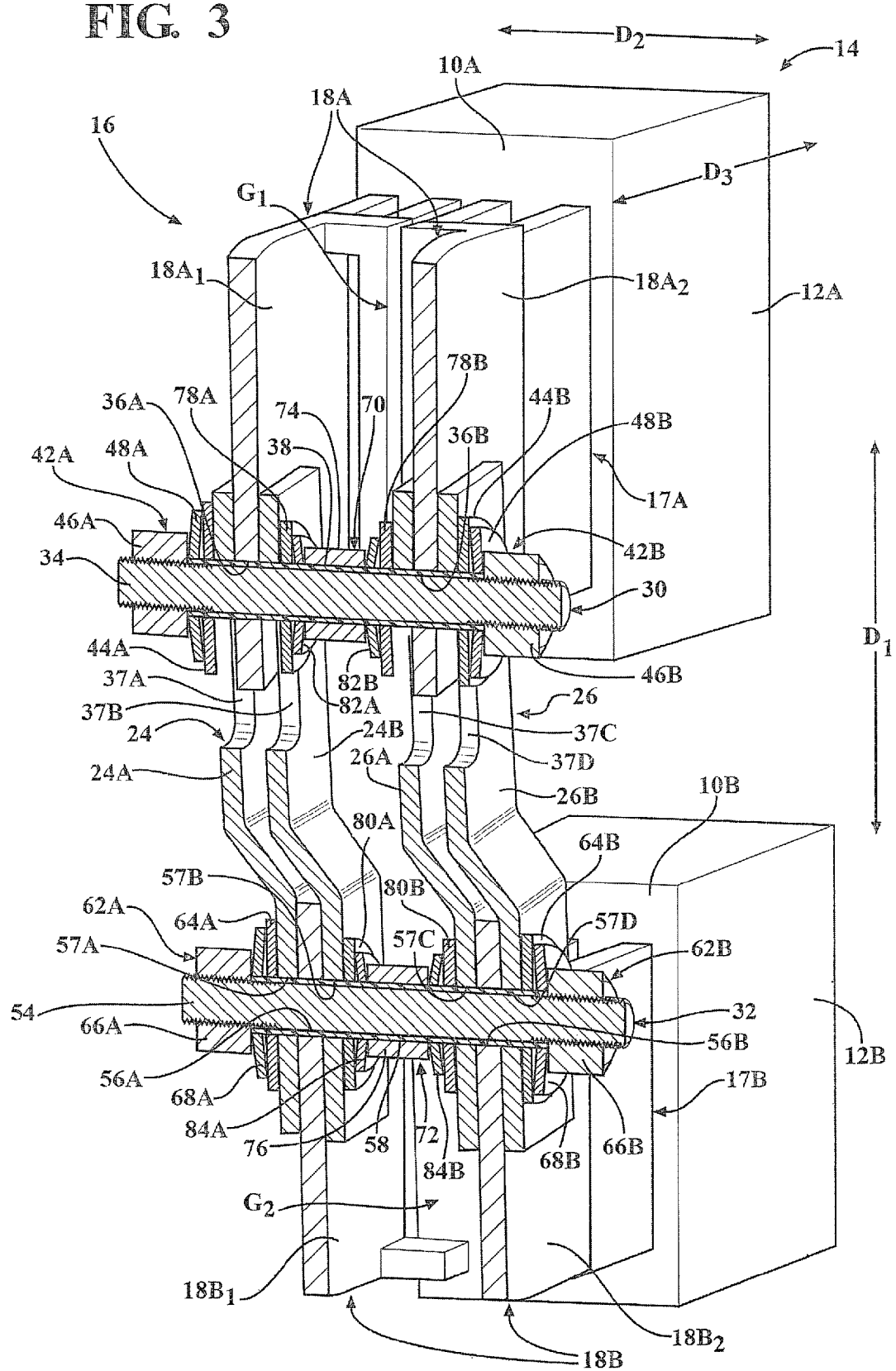

US 8,981,606 B2

BOLTED CONNECTOR FOR STATOR COILS OF AN ELECTRICAL GENERATOR

FIELD OF THE INVENTION

The present invention relates to connectors for stator coils of electrical generators, and more particularly, to bolted connectors that are able to accommodate positional misalignment between stator coil sections to be electrically and mechanically joined.

BACKGROUND OF THE INVENTION

In large electrical machinery, such as an electrical generator driven by a turbine in a power generating plant, the size and configuration of the generator typically requires that stator coils employed in the generator be arranged in physically separate coil sections or halves to facilitate installation and replacement of the coil sections. After installation in the generator, the coil sections need to be electrically and mechanically connected to one another at their ends. Similar connections may also be utilized between the ends of each phase coil and a parallel phase ring that may encircle the end of the generator stator windings.

These connections are typically formed by brazing copper connectors to the end of both of the coil sections to provide effective series and phase connections between the coil ends.

SUMMARY OF THE INVENTION

In accordance with a first aspect of the present invention, a connector assembly is provided for mechanically and electrically connecting respective ends of first and second stator coil sections that are spaced apart from one another in a first direction. The connector assembly comprises first and second clip assemblies, first and second connector bar assemblies, and first and second coupling structures. The first clip assembly is affixed to the end of the first stator coil section and comprises first and second clip members spaced apart from one another in a second direction transverse to the first direction so as to be electrically isolated from one another. The second clip assembly is affixed to the end of the second stator coil section and comprises third and fourth clip members spaced apart from the first and second clip members in the first direction and spaced apart from one another in the second direction so as to be electrically isolated from one another. The first connector bar assembly extends in the first direction and is coupled to the first and third clip members to structurally couple the first stator coil section to the second stator coil section. The second connector bar assembly extends in the first direction and is coupled to the second and fourth clip members to structurally couple the first stator coil section to the second stator coil section. The first and second connector bar assemblies are spaced apart from one another in the second direction so as to be electrically isolated from one another. The first coupling structure extends through openings in the first and second clip members and the first and second connector bar assemblies to couple the first clip member to the first connector bar assembly and to couple the second clip member to the second connector bar assembly. The first coupling structure is electrically isolated from the first and second clip members and from the first and second connector bar assemblies. The second coupling structure extends through openings in the third and fourth clip members and the first and second connector bar assemblies to couple the third clip member to the first connector bar assembly and to couple the fourth clip member to the second connector bar assembly. The second coupling structure is electrically isolated from the third and fourth clip members and from the first and second connector bar assemblies. The first clip member, the first connector bar assembly, and the third clip member create a first path for electric current between the first and second stator coil sections. The second clip member, the second connector bar assembly, and the fourth clip member create a second path for electric current between the first and second stator coil sections. The first and second paths are electrically isolated from one another.

In accordance with a second aspect of the present invention, a connector assembly is provided for mechanically and electrically connecting respective ends of first and second radially spaced apart stator coil sections. The connector assembly comprises first and second clip assemblies and at least one connector bar assembly. The first clip assembly is affixed to the end of the first stator coil section and the second clip assembly is affixed to the end of the second stator coil section and is radially spaced apart from the first clip assembly. The at least one connector bar assembly extends in the radial direction and is coupled to the first and second clip assemblies so as to mechanically and electrically couple the first stator coil section to the second stator coil section. The at least one connector bar assembly is capable of accommodating axial, radial, and circumferential misalignment between the ends of the first and second stator coil sections.

In accordance with a third aspect of the present invention, a connector assembly is provided for mechanically and electrically connecting respective ends of first and second stator coil sections that are radially spaced apart from one another. The connector assembly comprises first and second clip assemblies, first and second radially extending connector bar assemblies, and first and second coupling structures. The first clip assembly is affixed to the end of the first stator coil section and comprises first and second clip members circumferentially spaced apart from one another so as to be electrically isolated from one another. The second clip assembly is affixed to the end of the second stator coil section and comprises third and fourth clip members radially spaced apart from the first and second clip members and circumferentially spaced apart from one another so as to be electrically isolated from one another. The first connector bar assembly is coupled to the first and third clip members to structurally couple the first stator coil section to the second stator coil section. The second connector bar assembly is coupled to the second and fourth clip members to structurally couple the first stator coil section to the second stator coil section. The first and second connector bar assemblies are circumferentially spaced apart from one another so as to be electrically isolated from one another. The first coupling structure extends through openings in the first and second clip members and the first and second connector bar assemblies to couple the first clip member to the first connector bar assembly and to couple the second clip member to the second connector bar assembly. The first coupling structure is electrically isolated from the first and second clip members and from the first and second connector bar assemblies. The second coupling structure extends through openings in the third and fourth clip members and the first and second connector bar assemblies to couple the third clip member to the first connector bar assembly and to couple the fourth clip member to the second connector bar assembly. The second coupling structure is electrically isolated from the third and fourth clip members and from the first and second connector bar assemblies. The first clip member, the first connector bar assembly, and the third clip member create a first path for electric current between the first and second stator coil sections and the second clip member, the second connector bar assembly, and the fourth clip member create a second path for electric current between the first and second stator coil sections. The first and second paths are electrically isolated from one another, and the connector bar assemblies are capable of accommodating axial, radial, and circumferential misalignment between the ends of the first and second stator coil sections.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 3 is a cross sectional view taken along line 3-3 in FIG. 1.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

As used in the following description, reference to the connection of coil ends refers to the connection of ends of coil halves or sections, as well as the connection of coil ends to phase rings. Further, the phase "coil ends" embraces both coil ends and the headers of the generator phase parallel ring. Thus, a connector embodying aspects of the present invention may be used on either of the above-described connecting applications.

Figure 1:
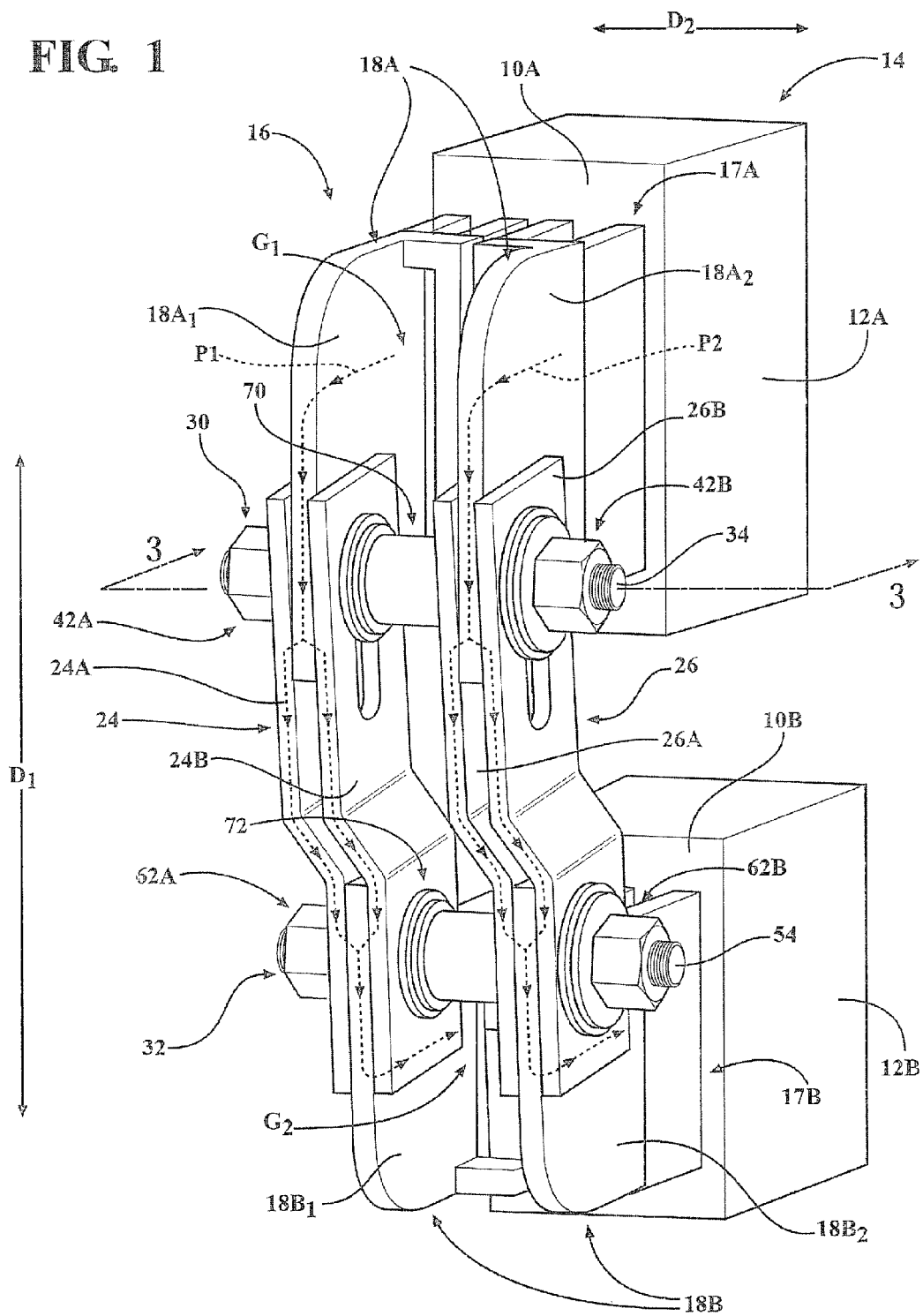
FIG. 1 is a perspective view of ends of a pair of exemplary stator coil sections of a generator stator, and also illustrating a connector assembly for connecting the ends according to an embodiment of the invention.
Figure 2:
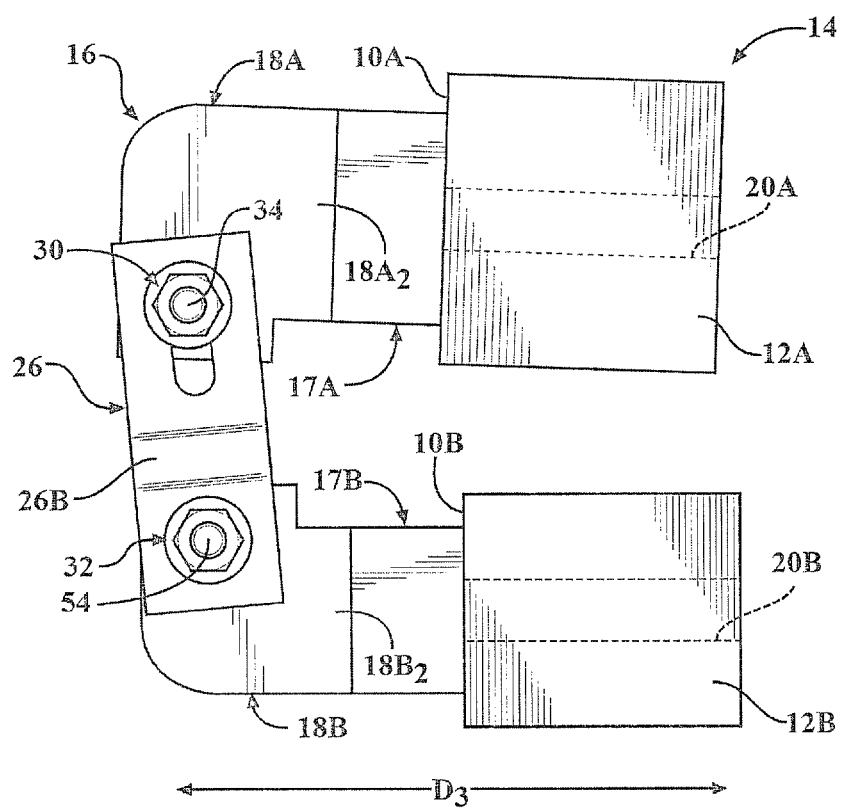
FIG. 2 is a side view of the exemplary stator coil sections and the connector assembly of FIG. 1.

Referring to FIGS. 1-3, ends 10A, 10B of first and second exemplary copper stator coil sections 12A, 12B of a generator stator 14, illustrated in FIG. 1 as top and bottom stator coil sections 12A, 12B, and a connector assembly 16 for connecting the ends 10A, 10B are shown. As will be apparent to those having ordinary skill in the art, the coil sections 12A, 12B are components of first and second stator coils or halves of a stator coil within the generator stator 14, which in turn may be part of an electrical generator of a power generating plant.

The stator coil section ends 10A, 10B are spaced apart from one another in a first direction $D_1$, which defines a radial direction in the embodiment shown, see FIG. 1. The top coil section 12A may represent the first half of a coil loop, while the bottom coil section 12B may represent the second half of the coil loop. The stator coil ends 10A, 10B may include attachment assemblies 17A, 17B for facilitating attachment of the connector assembly 16 components to the coil ends 10A, 10B, as will be described below.

The connector assembly 16 is provided for structurally and electrically connecting the ends 10A, 10B of the top and bottom coil sections 12A, 12B, and includes first and second clip assemblies 18A, 18B associated with the respective top and bottom coil sections 12A, 12B.

The first clip assembly 18A is affixed to the end 10A of the top coil section 12A, i.e., to the attachment assembly 17A in the embodiment shown, and comprises first and second clip members $18A_1$, $18A_2$ that are spaced apart from one another in a second direction $D_2$ so as to be electrically isolated from one another, see FIG. 1. The second direction $D_2$ is transverse to the first direction $D_1$ and defines a circumferential direction in the embodiment shown. The first and second clip members $18A_1$, $18A_2$ extend from the end 10A of the top coil section 12A in a third direction $D_3$, which defines an axial direction in the embodiment shown and which defines a direction of elongation of the of the first and second coils, see FIG. 2.

Referring to FIG. 2, the top coil section 12A includes a cooling tube 20A located circumferentially between the first and second clip members $18A_1$, $18A_2$. The cooling tube 20A receives a cooling fluid, such as hydrogen or air, to provide internal cooling to the top coil section 12A and the remainder of the first coil.

The second clip assembly 18B is affixed to the end 10B of the bottom coil section 12B, i.e., to the attachment assembly 17B in the embodiment shown, and is spaced apart from the first clip assembly 18A of the top coil section 12A in the first direction $D_1$. The second clip assembly 18B comprises third and fourth clip members $18B_1$, $18B_2$ that are spaced apart from one another in the second direction $D_2$ so as to be electrically isolated from one another. The third and fourth clip members $18B_1$, $18B_2$ extend from the end 10B of the bottom coil section 12B in the third direction $D_3$.

Referring to FIG. 2, the bottom coil section 12B includes a cooling tube 20B located circumferentially between the third and fourth clip members $18B_1$, $18B_2$. The cooling tube 20B receives cooling fluid to provide internal cooling to the bottom coil section 12B and the remainder of the second coil.

The connector assembly 16 further comprises first and second connector bar assemblies 24, 26, see FIGS. 1-3. The first connector bar assembly 24 comprises first and second connector bars 24A, 24B that are spaced apart from one another in the second direction $D_2$ and extend in the first direction $D_1$ between the first and third clip members $18A_1$, $18B_1$. The first and second connector bars 24A, 24B of the first connector bar assembly 24 sandwich the respective first and third clips members $18A_1$, $18B_1$ therebetween and thereby provide a secure mechanical and electrical connection between the top coil section 12A and the bottom coil section 12B of the coil loop. The first and second connector bars 24A, 24B of the first connector bar assembly 24 may be formed from copper or any other suitable electrically conductive material having adequate structural strength and current-carrying capacity requirements.

The second connector bar assembly 26 comprises first and second connector bars 26A, 26B that are spaced apart from one another in the second direction $D_2$ and extend in the first direction $D_1$ between the second and fourth clip members $18A_2$, $18B_2$. The first and second connector bars 26A, 26B of the second connector bar assembly 26 sandwich the respective second and fourth dip members $18A_2$, $18B_2$ therebetween and thereby provide a secure mechanical and electrical connection between the top coil section 12A and the bottom coil section 12B of the coil loop. The first and second connector bars 26A, 26B of the second connector bar assembly 26 may be formed from copper or any other suitable electrically conductive material having adequate structural strength and current-carrying capacity requirements.

While the illustrated first and second connector bar assemblies 24, 26 each include a pair of connector bars 24A, 24B and 26A, 26B, the first and second connector bar assemblies 24, 26 could include additional or fewer connector bars, i.e., the first and second connector bar assemblies 24, 26 could each include only a single connector bar or more than two connector bars.

As shown in FIGS. 1 and 3, the first and second connector bar assemblies 24, 26 are spaced apart from one another in the second direction $D_2$ so as to be electrically isolated from one another. The connector assembly 16 thus creates, through the first clip member $18A_1$, the first connector bar assembly 24, and the third clip member $18B_1$, a first path $P_1$ (see FIG. 1) for electric current between the first and second stator coil sections 12A, 12B. The connector assembly 16 further creates, through the second clip member $18A_2$, the second connector bar assembly 26, and the fourth clip member $18B_2$, a second path $P_2$ (see FIG. 1) for electric current between the first and second stator coil sections 12A, 12B, wherein the first and second paths $P_1$, $P_2$ are electrically isolated from one another.

As shown in FIGS. 1 and 3, gaps $G_1$, $G_2$ are formed between the first and second clip members $18A_1$, $18A_2$ and between the third and fourth clip members $18B_1$, $18B_2$. The gaps $G_1$, $G_2$ are formed at radially spaced apart locations between the second connector bar 24B of the first connector bar assembly 24 and the first connector bar 26A of the second connector bar assembly 26. The gaps $G_1$, $G_2$ provide direct access to the cooling tubes 20A, 20B in the first and second stator coil sections 12A, 12B. Hence, separate holes or openings formed through the components of the connector assembly 16 are not required for providing access to the cooling tubes 20A, 20B.

The connector assembly 16 further comprises hardware for securing the electric current path-defining components of the connector assembly 16 together. In the embodiment shown, first coupling structure 30 is associated with the top coil section 12A to couple the first clip member $18A_1$ to the first connector bar assembly 24 and to couple the second clip member $18A_2$ to the second connector bar assembly 26, and second coupling structure 32 is associated with the bottom coil section 12B to couple the third clip member $18B_1$ to the first connector bar assembly 24 and to couple the fourth clip member $18B_2$ to the second connector bar assembly 26.

Referring to FIG. 3, the first coupling structure 30 comprises a first bolt 34 that extends through openings 36A, 36B in the first and second clip members $18A_1$, $18A_2$ and openings 37A, 37B, 37C, 37D in the connector bars 24A, 24B, 26A, 26B of the first and second connector bar assemblies 24, 26. An insulative sleeve 38 may be disposed around the first bolt 34 so as to electrically isolate the first bolt 34 from the first and second clip members $18A_1$, $18A_2$ and from the connector bar assemblies 24, 26, i.e., by preventing direct contact between the first bolt 34 and the first and second clip members $18A_1$, $18A_2$ and between the first bolt 34 and the connector bar assemblies 24, 26.

The first bolt 34 is locked in place with first and second clamping assemblies 42A, 42B affixed to opposite end portions of the first bolt 34. In the embodiment shown, the clamping assemblies 42A, 42B each comprise an insulating washer 44A, 44B that engages the respective connector bar assembly 24, 26, a nut 46A, 46B threaded on the respective bolt end portion for providing compressive forces, and a Belleville washer 48A, 48B disposed between the insulating washer 44A, 44B and the corresponding nut 46A, 46B. The insulating washers 44A, 44B electrically isolate the respective clamping assemblies 42A, 42B from the first and second clip members $18A_1$, $18A_2$ and from the first and second connector bar assemblies 24, 26. The clamping assemblies 42A, 42B apply compressive forces in the second direction $D_2$ to urge the first and second clip members $18A_1$, $18A_2$ into engagement with the respective connector bar assemblies 24, 26.

As shown in FIG. 3, the second coupling structure 32 comprises a second bolt 54 that extends through openings 56A, 56B in the third and fourth clip members $18B_1$, $18B_2$ and openings 57A, 57B, 57C, 57D in the connector bars 24A, 24B, 26A, 26B of the first and second connector bar assemblies 24, 26. An insulative sleeve 58 may be disposed around the second bolt 54 so as to electrically isolate the second bolt 54 from the third and fourth clip members $18B_1$, $18B_2$ and from the connector bar assemblies 24, 26, i.e., by preventing direct contact between the second bolt 54 and the third and fourth clip members $18B_1$, $18B_2$ and between the second bolt 54 and the connector bar assemblies 24, 26.

The second bolt 54 is locked in place with first and second clamping assemblies 62A, 62B affixed to opposite end portions of the second bolt 54. In the embodiment shown, the clamping assemblies 62A, 62B each comprise an insulating washer 64A, 64B that engages the respective connector bar assembly 24, 26, a nut 66A, 66B threaded on the respective bolt end portion for providing compressive forces, and a Belleville washer 68A, 68B disposed between the insulating washer 64A, 64B and the corresponding nut 66A, 66B. The insulating washers 64A, 64B electrically isolate the respective clamping assemblies 62A, 62B from the third and fourth clip members $18B_1$, $18B_2$ and from the first and second connector bar assemblies 24, 26. The clamping assemblies 62A, 62B apply compressive forces in the second direction $D_2$ to urge the third and fourth clip members $18B_1$, $18B_2$ into engagement with the respective connector bar assemblies 24, 26.

Referring to FIGS. 1 and 3, first and second spacer assemblies 70, 72 are disposed about the respective first and second bolts 34, 54, and, more specifically, about the respective insulative sleeves 38, 58. The spacer assemblies 70, 72 are located between and engaged with the respective first and second connector bar assemblies 24, 26 so as to provide a counteracting force in the second direction $D_2$ against the compressive forces applied by the respective clamping assemblies 42A, 42B, 62A, 62B. That is, when the nuts 46A, 46B, 66A, 66B of the respective coupling structures 30, 32 are tightened on the bolts 34, 54, to provide a compressive force in the second direction, the spacer assemblies 70, 72 provide an intermediate structure to apply a counteracting force against the compressive force.

In the embodiment shown, referring to FIG. 3 the spacer assemblies 70, 72 each comprise a central cylindrical tube member 74, 76, opposed first and second insulating washers 78A, 78B, 80A, 80B in contact with the respective first and second connector bar assemblies 24, 26, and opposed first and second Belleville washers 82A, 82B, 84A, 84B located between the tube members 74, 76 and the respective insulating washers 78A, 78B, 80A, 80B.

By way of example, the insulative sleeves 38, 58 and the insulating washers 44A, 44B, 64A, 64B, 78A, 78B, 80A, 80B may be formed from a high-temperature, low mechanical creep, electrically insulating material, such as National Electrical Manufactures Association (NEMA) Grade G-11. As will be appreciated by those skilled in the art, this is an example of a glass-epoxy composite material with substantially high strength and high dimensional stability over a wide temperature range.

The connector assembly 16 described above provides two parallel electrically conductive paths $P_1$, $P_2$ that are electrically insulated from one another for passing respective flows of electric current between the coil ends 10A, 10B. It will be appreciated that the spacing between the components that create the first and second paths $P_1$, $P_2$ should be selected based on the needs of any given application, such as the expected peak current levels to be carried, to avoid current crossover between the bifurcated structures.

In accordance with the present invention, the connector assembly 16 can be adjusted to accommodate misalignment between the ends 10A, 10B of the top and bottom stator coil sections 12A, 12B in the first, second, and third directions $D_1$-$D_3$, i.e., in the radial, circumferential, and axial directions. When the first and second coils are placed in the generator stator 14, the stator coil section ends 10A, 10B may not line up with respect to one another in ideal radial, circumferential, and/or axial positions, and the connector assembly 16 described herein can be adjusted to accommodate these alignment issues.

To accommodate misalignment of the ends 10A, 10B in the first direction $D_1$, i.e., the radial direction in the embodiment shown, the openings 37A, 37B, 37C, 37D in the first and second connector bars 24A, 24B, 26A, 26B and/or the openings 57A, 57B, 57C, 57D in the first and second connector bars 24A, 24B, 26A, 26B can be oversized in the first direction $D_1$, as shown in FIG. 3. In the case of misalignment in the first direction $D_1$, the bolt 34 can be slid within the oversized openings 37A, 37B, 37C, 37D in the first and second connector bars 24A, 24B, 26A, 26B and/or the bolt 54 can be slid the oversized openings 57A, 57B, 57C, 57D in the first and second connector bars 24A, 24B, 26A, 26B. With the oversized openings 37A, 37B, 37C, 37D and/or 57A, 57B, 57C, 57D, the first and second connector bar assemblies 24, 26 are adjustably coupled to the first clip assembly 18A and/or the second clip assembly 18B in the radial direction to accommodate radial misalignment between the ends 10A, 10B of the first and second stator coil sections 12A, 12B. In another embodiment, the openings 36A, 36B in the first and second clip members 18A$_1$, 18A$_2$ and/or the openings 56A, 56B in the third and fourth clip members 18B$_1$, 18B$_2$ can be oversized in the first direction $D_1$.

To accommodate misalignment of the ends 10A, 10B in the second direction $D_2$, i.e., the circumferential direction in the embodiment shown, the connector bars 24A, 24B, 26A, 26B of the first and second connector bar assemblies 24, 26 can be obstinately bent in the second direction $D_2$, as shown in FIGS. 1 and 3. The first and second connector bar assemblies 24, 26 can be bent in the second direction $D_2$ "on the spot", i.e., once the first and second coils are in place and it is determined how much bending is needed, or appropriate pre-bent connector bars can be selected from a group of connector bars having differing amounts of bending. It is also noted that if there is no misalignment of the ends 10A, 10B in the second direction $D_2$, the connector bars 24A, 24B, 26A, 26B of the first and second connector bar assemblies 24, 26 can be provided as generally straight members.

To accommodate misalignment of the ends 10A, 10B in the third direction $D_3$, i.e., the axial direction in the embodiment shown, the connector bar assemblies 24, 26 are pivotably coupled to the first and second clip assemblies 18A, 18B in the third direction $D_3$, as shown in FIG. 2. Hence, the connector bar assemblies 24, 26 can be pivoted in the third direction $D_3$ one way or the other to accommodate misalignment of the ends 10A, 10B in the third direction $D_3$.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A connector assembly for mechanically and electrically connecting respective ends of first and second stator coil sections that are spaced apart from one another in a first direction comprising:
   a first clip assembly affixed to the end of the first stator coil section, the first clip assembly comprising first and second clip members spaced apart from one another in a second direction transverse to the first direction so as to be electrically isolated from one another;
   a second clip assembly affixed to the end of the second stator coil section, the second clip assembly comprising third and fourth clip members spaced apart from one another in the second direction so as to be electrically isolated from one another and spaced apart from the first and second clip members in the first direction;
   a first connector bar assembly extending in the first direction and coupled to the first and third clip members to structurally couple the first stator coil section to the second stator coil section;
   a second connector bar assembly extending in the first direction and coupled to the second and fourth clip members to structurally couple the first stator coil section to the second stator coil section, the first and second connector bar assemblies being spaced apart from one another in the second direction so as to be electrically isolated from one another;
   first coupling structure that extends through openings in the first and second clip members and the first and second connector bar assemblies to couple the first clip member to the first connector bar assembly and to couple the second clip member to the second connector bar assembly, the first coupling structure being electrically isolated from the first and second clip members and from the first and second connector bar assemblies; and
   second coupling structure that extends through openings in the third and fourth clip members and the first and second connector bar assemblies to couple the third clip member to the first connector bar assembly and to couple the fourth clip member to the second connector bar assembly, the second coupling structure being electrically isolated from the third and fourth clip members and from the first and second connector bar assemblies;
   wherein:
      the first clip member, the first connector bar assembly, and the third clip member create a first path for electric current between the first and second stator coil sections;
      the second clip member, the second connector bar assembly, and the fourth clip member create a second path for electric current between the first and second stator coil sections; and
      the first and second paths are electrically isolated from one another.

2. The connector assembly of claim 1, wherein the first and second coupling structures comprise first and second bolts having insulative sleeves disposed therearound to electrically isolate the bolts from the clip members and the connector bar assemblies.

3. The connector assembly of claim 2, wherein the first and second coupling structures further comprise first and second clamping assemblies, each clamping assembly affixed to opposite end portions of the bolts, the clamping assemblies applying compressive forces in the second direction to urge the clip members into engagement with the respective connector bar assemblies.

4. The connector assembly of claim 3, wherein each clamping assembly comprises:
   an insulating washer that engages the respective connector bar assembly;
   a nut threaded on the respective bolt end portion for providing compressive forces; and
   a Belleville washer disposed between the insulating washer and the nut.

5. The connector assembly of claim 3, further comprising first and second spacer assemblies disposed about the respective first and second bolts between and engaged with the respective first and second connector bar assemblies, the spacer assemblies providing a counteracting force in the second direction against the compressive forces applied by the first and second clamping assemblies.

6. The connector assembly of claim 1, wherein the first and second connector bar assemblies each comprise first and second connector bars that are spaced apart from one another in the second direction, wherein the first and second connector bars of the first connector bar assembly sandwich the first and third clip members therebetween and the first and second connector bars of the second connector bar assembly sandwich the second and fourth clip members therebetween.

7. The connector assembly of claim 1, wherein gaps are formed between the first and second clip members and the third and fourth clip members, the gaps providing access to cooling tubes in the first and second stator coil sections that receive cooling fluid for cooling the first and second stator coil sections.

8. A connector assembly for mechanically and electrically connecting respective ends of first and second radially spaced apart stator coil sections comprising:
   a first clip assembly affixed to the end of the first stator coil section;
   a second clip assembly affixed to the end of the second stator coil section and being radially spaced apart from the first clip assembly; and
   at least one connector bar assembly extending in the radial direction and coupled to the first and second clip assemblies so as to mechanically and electrically couple the first stator coil section to the second stator coil section, the at least one connector bar assembly capable of accommodating axial, radial, and circumferential misalignment between the ends of the first and second stator coil sections, wherein the at least one connector bar assembly is coupled to the first and second clip assemblies by first and second radially spaced apart bolts that pass through respective openings formed in the at least one connector bar assembly and the first and second clip assemblies, at least one of the openings being oversized in the radial direction such that the radial location of the coupling between the at least one connector bar assembly and at least one of the first and second clip assemblies can be adjusted to accommodate radial misalignment between the ends of the first and second stator coil sections.

9. The connector assembly of claim 8, wherein the at least one connector bar assembly is pivotably coupled to the first and second clip assemblies in the axial direction to accommodate axial misalignment between the ends of the first and second stator coil sections.

10. The connector assembly of claim 8, wherein the at least one connector bar assembly is capable of being obstinately bent in the circumferential direction to accommodate circumferential misalignment between the ends of the first and second stator coil sections.

11. The connector assembly of claim 8, wherein the at least one connector bar assembly is selected from a group of connector bar assemblies having differing amounts of circumferential bending, the selected connector bar assembly having an amount of circumferential bending generally corresponding to an amount of circumferential misalignment between the ends of the first and second stator coil sections.

12. A connector assembly for mechanically and electrically connecting respective ends of first and second stator coil sections that are radially spaced apart from one another comprising:
   a first clip assembly affixed to the end of the first stator coil section, the first clip assembly comprising first and second clip members circumferentially spaced apart from one another so as to be electrically isolated from one another;
   a second clip assembly affixed to the end of the second stator coil section, the second clip assembly comprising third and fourth clip members radially spaced apart from the first and second clip members and circumferentially spaced apart from one another so as to be electrically isolated from one another;
   a first radially extending connector bar assembly coupled to the first and third clip members to structurally couple the first stator coil section to the second stator coil section;
   a second radially extending connector bar assembly coupled to the second and fourth clip members to structurally couple the first stator coil section to the second stator coil section, the first and second connector bar assemblies being circumferentially spaced apart from one another so as to be electrically isolated from one another;
   first coupling structure that extends through openings in the first and second clip members and the first and second connector bar assemblies to couple the first clip member to the first connector bar assembly and to couple the second clip member to the second connector bar assembly, the first coupling structure being electrically isolated from the first and second clip members and from the first and second connector bar assemblies; and
   second coupling structure that extends through openings in the third and fourth clip members and the first and second connector bar assemblies to couple the third clip member to the first connector bar assembly and to couple the fourth clip member to the second connector bar assembly, the second coupling structure being electrically isolated from the third and fourth clip members and from the first and second connector bar assemblies;
   wherein:
      the first clip member, the first connector bar assembly, and the third clip member create a first path for electric current between the first and second stator coil sections;
      the second clip member, the second connector bar assembly, and the fourth clip member create a second path for electric current between the first and second stator coil sections;
      the first and second paths are electrically isolated from one another; and
      the connector bar assemblies are capable of accommodating axial, radial, and circumferential misalignment between the ends of the first and second stator coil sections.

13. The connector assembly of claim 12, wherein:
the connector bar assemblies are pivotably coupled to each of the clip members in the axial direction to accommodate axial misalignment between the ends of the first and second stator coil sections;
the connector bar assemblies are each adjustably coupled to at least one of the clip members in the radial direction to accommodate radial misalignment between the ends of the first and second stator coil sections; and
at least one of:
the connector bar assemblies are capable of being obstinately bent in the circumferential direction to accommodate circumferential misalignment between the ends of the first and second stator coil sections; and
the connector bar assemblies are selected from a group of connector bar assemblies having differing amounts of circumferential bending, each selected connector bar assembly having an amount of circumferential bending generally corresponding to an amount of circumferential misalignment between the ends of the first and second stator coil sections.

14. The connector assembly of claim 13, wherein the openings in at least one of the first and third clip members and at least one of the second and fourth clip members are oversized in the radial direction such that the radial location of the coupling between the connector bar assemblies and the clip members with the radially oversized openings can be adjusted to accommodate radial misalignment between the ends of the first and second stator coil sections.

15. The connector assembly of claim 12, wherein the first and second coupling structures comprise:
first and second bolts having insulative sleeves disposed therearound to electrically isolate the bolts from the clip members and the connector bar assemblies; and
first and second clamping assemblies, each clamping assembly affixed to opposite end portions of the bolts, the clamping assemblies applying compressive forces in the circumferential direction to urge the clip members into engagement with the respective connector bar assemblies.

16. The connector assembly of claim 15, wherein each clamping assembly comprises:
an insulating washer that engages the respective connector bar assembly;
a nut threaded on the respective bolt end portion for providing compressive forces; and
a Belleville washer disposed between the insulating washer and the nut.

17. The connector assembly of claim 15, further comprising first and second spacer assemblies disposed about the respective first and second bolts between and engaged with the respective first and second connector bar assemblies, the spacer assemblies providing a counteracting force in the circumferential direction against the compressive forces applied by the first and second clamping assemblies.

18. The connector assembly of claim 12, wherein gaps are formed between the first and second clip members and the third and fourth clip members, the gaps providing access to cooling tubes in the first and second stator coil sections that receive cooling fluid for cooling the first and second stator coil sections.

* * * * *